United States Patent
Butt et al.

(10) Patent No.: US 11,039,484 B2
(45) Date of Patent: Jun. 15, 2021

(54) COMMUNICATIONS DEVICE, AN ACCESS POINT AND METHODS THEREIN FOR ACCESSING A RESOURCE UNIT

(71) Applicant: Telefonaktiebolaget LM Ericsson (publ), Stockholm (SE)

(72) Inventors: Naveed Butt, Lund (SE); Thomas Nilsson, Malmo (SE); Leif Wilhelmsson, Dalby (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 56 days.

(21) Appl. No.: 16/562,191

(22) Filed: Sep. 5, 2019

(65) Prior Publication Data

US 2019/0394800 A1 Dec. 26, 2019

Related U.S. Application Data

(62) Division of application No. 15/313,553, filed as application No. PCT/EP2016/058970 on Apr. 22, 2016, now Pat. No. 10,425,972.

(51) Int. Cl.
*H04W 74/08* (2009.01)
*H04W 74/00* (2009.01)

(52) U.S. Cl.
CPC ....... *H04W 74/085* (2013.01); *H04W 74/008* (2013.01); *H04W 74/0833* (2013.01)

(58) Field of Classification Search
CPC ........... H04W 74/085; H04W 74/0833; H04W 74/008
See application file for complete search history.

(56) References Cited

U.S. PATENT DOCUMENTS 6,965,942 B1 11/2005 Young et al.
2003/0174665 A1 9/2003 Benveniste
(Continued)

FOREIGN PATENT DOCUMENTS

EP 2993953 A1 3/2016

OTHER PUBLICATIONS

PCT International Search Report, dated Jan. 20, 2017, in connection with International Application No. PCT/EP2016/058970, all pages.
(Continued)

*Primary Examiner* — Min Jung
(74) *Attorney, Agent, or Firm* — Lefflet Intellectual Property Law, PLLC

(57) ABSTRACT

A communications device and a method therein for accessing a Resource Unit (RU) are provided. The communications device and an Access Point (AP) are operating in a wireless communications network. When wanting to start an access attempt within a time interval, the communications device selects a counter value from a first range given by zero and a first Contention-Window OFDMA (CWO) value $CWO_1$. Further, when wanting to start an access attempt outside the time interval, the communications device selects the counter value from a second range given by zero and a second CWO value $CWO_2$, wherein the second CWO value $CWO_2$ is larger than the first CWO value $CWO_1$. The communications device performs a contention procedure using the selected counter value, wherein a Resource Unit (RU) is accessed in dependence of the performed contention procedure.

9 Claims, 6 Drawing Sheets

Method performed by the AP 202

(56) References Cited

U.S. PATENT DOCUMENTS

| | | | |
|---|---|---|---|
| 2006/0034210 A1 | 2/2006 | Chu et al. | |
| 2013/0010774 A1 | 1/2013 | Subramanian et al. | |
| 2015/0103767 A1 | 4/2015 | Kim et al. | |
| 2016/0381709 A1* | 12/2016 | Ghosh | H04W 24/08 370/329 |
| 2017/0223730 A1 | 8/2017 | Jiang et al. | |
| 2018/0084605 A1* | 3/2018 | Li | H04W 74/0858 |
| 2018/0092032 A1* | 3/2018 | Choi | H04L 27/26 |
| 2019/0037478 A1* | 1/2019 | Yu | H04W 48/12 |
| 2019/0045426 A1* | 2/2019 | Yan | H04L 5/0048 |

OTHER PUBLICATIONS

PCT Written Opinion, dated Jan. 20, 2017, in connection with International Application No. PCT/EP2016/058970, all pages.

Stephane Baron et al., Traffic priority for random Multi User Uplink OFDMA, IEEE 802.11-15/12800, vol. 802.11ax, No. 1, Piscataway, NJ, USA, Nov. 9, 2015, pp. 1-24.

3GPP TSG RAN WG1 Meeting #84bis, R1-162920, Busan, South Korea, Apr. 11-15, 2016, Channel Access for LAA UL, Nokia, Alcatel-Lucent Shanghai Bell, 9 pages.

Inwhee, Joe et al., "Reservation CSMA/CA for Multimedia Traffice over Mobile Ad-hoc Networks", 2000 IEEE, pp. 1714-1718.

\* cited by examiner

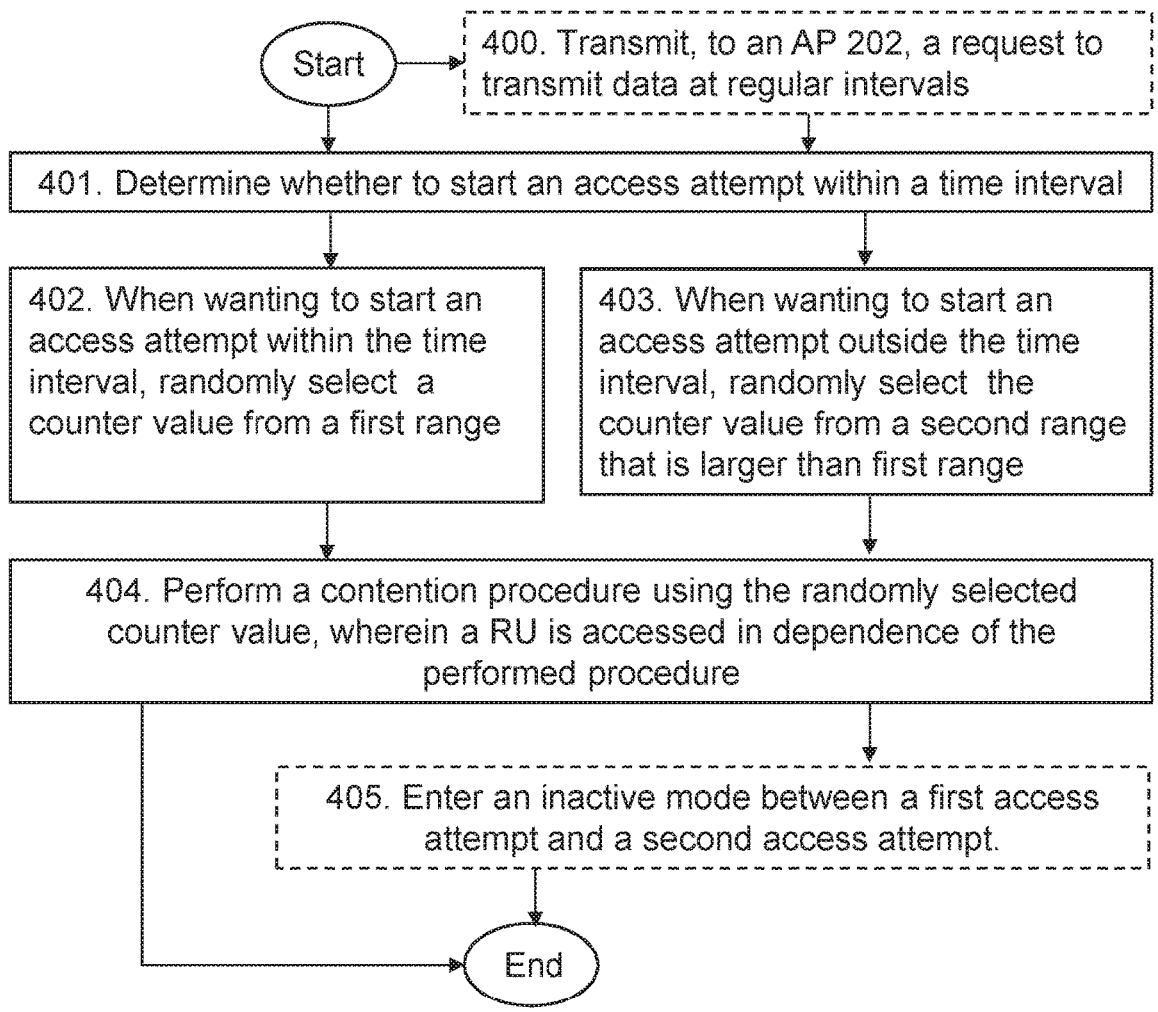
Figure 4 Method performed by communications device 204

Figure 7 Method performed by the AP 202

COMMUNICATIONS DEVICE, AN ACCESS POINT AND METHODS THEREIN FOR ACCESSING A RESOURCE UNIT

CROSS-REFERENCE TO RELATED APPLICATIONS

This application claims the benefit of U.S. application Ser. No. 15/313,553 filed Nov. 22, 2016, (371(c) date), which is a 35 U.S.C. § 371 national stage of international application PCT/EP2016/058970 filed Apr. 22, 2016. All of these earlier applications are hereby incorporated herein by reference in their entireties.

TECHNICAL FIELD

Embodiments herein relate generally to a communications device, an Access Point (AP) and to methods therein. In particular, embodiments relate to accessing a Resource Unit (RU).

BACKGROUND

Communication devices such as terminals are also known as e.g. User Equipments (UE), mobile terminals, stations (STAs), wireless devices, wireless terminals and/or mobile stations. Terminals are enabled to communicate wirelessly in a wireless communications network, such as a Wireless Local Area Network (WLAN), or a cellular communications network sometimes also referred to as a cellular radio system or cellular networks. The communication may be performed e.g. between two terminals, between a terminal and a regular telephone and/or between a terminal and a server via an access network and possibly one or more core networks, comprised within the wireless communications network.

The above communications devices may further be referred to as mobile telephones, cellular telephones, laptops, tablets or sensors with wireless capability, just to mention some further examples. The communications devices in the present context may be, for example, portable, pocket-storable, hand-held, wall-mounted, computer-comprised, or vehicle-mounted mobile devices, enabled to communicate voice and/or data, via the access network, such as a Radio Access Network (RAN), with another entity, such as an Access Point (AP), another communications device or a server.

The currently used WLAN standard, defined in the Institute of Electrical and Electronics Engineers (IEEE) 802.11ac, is based on distributed channel access through the Carrier Sense Multiple Access with Collision Avoidance (CSMA/CA) technique. A communications device that wishes to transmit must first listen to a communications medium and keep on deferring from transmitting as long as the communications medium is assessed to be busy. Once the communications medium is found idle, the waiting communications device generates a random backoff period selected within a certain time range called the Contention Window (CW). If at the end of this backoff period the medium is still idle, the communications device transmits. Since multiple listeners, e.g. multiple communications devices wanting to transmit, may transmit at the same point in time after the first backoff, collisions may occur. In case of a collision, each communications device must double its contention window unless it is already at the maximum allowed value. Once a communications device gets hold of the communications channel, it may transmit its data as OFDM symbols. In addition, the Specification Framework Document (SFD) for the next generation WLAN standard, IEEE 802.11ax, envisions an Orthogonal Frequency Division Multiple Access (OFDMA) scheme to allow multiple users, e.g. multiple communications devices, to transmit and/or receive simultaneously in orthogonal subbands, called Resource Units (RU). For the purpose of uplink (UL) contention, the 802.11ax SFD describes the transmission of a special trigger frame from the AP to the communications device(-s). This trigger frame is called Trigger Frame for Random access (TF-R) and comprises information about RUs that may be randomly accessed by more than one communications device. When the communications device wants to transmit, e.g. it has a frame to send, it initializes a counter called UL-OFDMA Backoff (OBO) to a random value in the range 0 to a Contention-Window OFDMA (CWO) value. The smaller the OBO is for the communications device, the higher are its chances of winning one of the RUs designated in the trigger frames (TF-Rs) transmitted from the AP. After winning the contention, the communications device may transmit one or more management frames, such as an Association Request, a Probe Request, etc., or data packets, over one of the RUs. A particular instance of the TF-R and contention is depicted in FIG. 1. It is assumed that a first communications device STA 1, a second communications device STA 2, and a third communications device STA 3 have UL data to send and their starting OBOs are 11, 5, and 0, respectively. Upon receiving the TF-R, each of the contending communications devices STA 1, STA 2, STA 3, decrements its counter once per available RU, unless its counter has reached zero. Following this, a communications device whose counter has reached zero transmits its data on any one of the available RUs chosen at random. In the depicted instance, there are three RUs RU1, RU2, RU3 available for contention. Thus the first and second communications devices STA 1, STA 2 decrement their counters to 8 and 2, respectively. The third communications device STA 3 which was already at zero, does not decrement its counter. Following this, since only the third communications device STA3 has an OBO value equal to zero, it is the only one among the three communications devices that qualifies for transmission and therefore randomly selects an RU for its transmission. The first and second communications devices STA 1, STA 2 that failed to reach an OBO equal to zero, do not transmit in this instance, and they will wait for a subsequent TF-R where they will begin with the OBOs equal to 8 and 2, respectively.

With the introduction of Internet-of-Things (IoT), it is expected that a very large number of Long-Range Low-Power (LRLP) communications devices will be associated with an AP. The IEEE 802.11 LRLP Topic Interest Group (TIG) has recently begun working on a potential WLAN standard for LRLP communications devices. It is expected that 802.11 LRLP will be built primarily on IEEE 802.11ax. Sometimes herein the LRLP communications devices are referred to as just LRLP devices.

To decrease the collision probability in communications networks with thousands of communications devices, e.g. referred to as stations (STA)s, and thus to improve power efficiency, the IEEE 802.11ah has developed the so-called Restricted Access Window (RAW). The key idea of RAW is to limit the set of communications devices accessing the channel and to spread their access attempts over a long period of time. Essentially, the RAW divides communications devices into groups and splits the channel into slots. Then it assigns each slot to a group, and the communications devices are only allowed to transmit in their slots. This is implemented as follows. By broadcasting in beacons special RAW Parameter Set (RPS) information elements, the AP allocates one or more restricted medium access intervals, each called a RAW. During the RAW, only a set of communications devices determined according to specific rules can access the communications medium. At the beginning of the RAW, the allocated communications devices suspend and save their normal backoff function, such as values of backoff counters, retry limits, contention window, and initialize a new backoff function according to an agreed-upon Access Category (AC) which is set as RAW AC. This backoff function is used till the end of the RAW, when the normal backoff function is restored and resumed.

A drawback with the current IEEE 802.11ax contention mechanism is that it does not exploit the transmission behaviour of communications devices operating in the communications network. In addition, the RAW mechanism of the IEEE 802.11ah is limited to time-domain allocations exclusive to certain groups of communications devices.

SUMMARY

An object of embodiments herein is to address at least some of the above-mentioned drawbacks among others and to improve the performance in a communications network.

According to one aspect of embodiments herein, the object is achieved by a method performed by a communications device for accessing a Resource Unit (RU). The communications device and an Access Point (AP) are operating in a wireless communications network.

When wanting to start an access attempt within a time interval, the communications device randomly selects a counter value from a first range given by zero and a first Contention-Window OFDMA (CWO) value $CWO_1$.

When wanting to start an access attempt outside the time interval, the communications device randomly selects the counter value from a second range given by zero and a second CWO value $CWO_2$, wherein the second CWO value $CWO_2$ is larger than the first CWO value $CWO_1$.

Further, the communications device performs a contention procedure using the selected counter value, wherein RU is accessed in dependence of the performed contention procedure.

According to another aspect of embodiments herein, the object is achieved by a communications device for accessing a Resource Unit (RU). The communications device and an Access Point (AP) are operable in a wireless communications network.

The communications device is configured to randomly select a counter value from a first range given by zero and a first Contention-Window OFDMA (CWO) value $CWO_1$, when wanting to start an access attempt within a time interval.

Further, the communications device is configured to randomly select the counter value from a second range given by zero and a second CWO value $CWO_2$, when wanting to start an access attempt outside the time interval, wherein the second CWO value $CWO_2$ is larger than the first CWO value $CWO_1$.

Further, the communications device is configured to perform a contention procedure using the selected counter value, wherein RU is accessed in dependence of the performed contention procedure.

According to another aspect of embodiments herein, the object is achieved by a method performed by an Access Point (AP) for controlling access to a Resource Unit (RU) by a communications device. The AP and the communications device are operating in a wireless communications network.

The AP receives, from the communications device, a request to access a RU for transmitting data at points in time spaced apart by T time units.

Further, the AP determines a start point of time $T_0$ for an access attempt at a time interval of length $2\delta$, wherein $\delta \ll T$; and transmits, to the communications device, information relating to the start point of time $T_0$, and $\delta$ of a time interval.

According to another aspect of embodiments herein, the object is achieved by an Access Point (AP) for controlling access to a Resource Unit (RU) by a communications device. The AP and the communications device are operating in a wireless communications network.

The AP is configured to receive, from the communications device, a request to access a RU for transmitting data at points in time spaced apart by T time units.

Further, the AP is configured to determine a start point of time $T_0$ for an access attempt at a time interval of length $2\delta$, wherein $\delta \ll T$; and to transmit, to the communications device, information relating to the start point of time $T_0$, and $\delta$ of a time interval.

According to another aspect of embodiments herein, the object is achieved by a computer program, comprising instructions which, when executed on at least one processor, causes the at least one processor to carry out the method performed by the communications device.

According to another aspect of embodiments herein, the object is achieved by a computer program, comprising instructions which, when executed on at least one processor, causes the at least one processor to carry out the method performed by the AP.

According to another aspect of embodiments herein, the object is achieved by a carrier comprising the computer program, wherein the carrier is one of an electronic signal, an optical signal, a radio signal or a computer readable storage medium.

Since the communications device, when it wants to start an access attempt within the time interval, randomly selects a counter value from a first range given by zero and the first CWO value $CWO_1$, which range is smaller than the second range, and since the communications device performs the contention procedure with the selected counter, the likelihood for the communications device to win a contention is higher than if it wants to start an access attempt outside the time interval and has to select the counter value from the second range. Thereby, it could be said that the communications device is rewarded when wanting to start the access attempt within the time interval. Thereby, saving power in the communications device and reducing the load in the communications network. This results in an improved performance in the communications network.

An advantage with embodiments herein is that they allow communications devices, such as low-power devices, with roughly regular transmission needs to win a RU contention, e.g. an OFDMA UL contention, with higher probability if they contend in regular time intervals, here termed, "reward windows". This 'soft' allocation may help save power for such communications devices and will also clear up the communications network from unwanted random contentions from these communications devices.

Further, in view of the RAW mechanism of the IEEE 802.11ah, some embodiments herein have one or more of the following advantages:

Firstly, embodiments herein are not restricted to timeslots, but rather exploits the frequency sub-channeling available in OFDMA.

Secondly, unlike RAW, the time interval, e.g. the predetermined time interval sometimes herein referred to as a reward window or a proposed reward window, of embodiments disclosed herein does not bar any other communications device in the communications network, e.g. in a Basic Serving Set (BSS), from competing for access it only puts them at a disadvantage. This may prevent spectrum wastage if, for example, the intended communications device, e.g. the LRLP device, has no data to transmit during a reward window, as then other communications devices with data may still access the medium. In case of RAW, however, if only communications devices not allowed to send in the current RAW have data to send, then the channel may by unused.

Thirdly, for some embodiments herein the time interval, e.g. the proposed reward window, is not binding, in that, it is a window where an intended communications device will have better chances to quickly access the channel, but, the communications device may, if found beneficial, decide to also try to access the channel at other times but then at a potential cost that it will use more power for listening and eventually find the channel idle.

Fourthly, the opportunity available in RAW is time-limited in the sense that if a communications device does not win contention within its RAW slot and allocated group, the opportunity is lost. However according to some embodiments herein, the advantage picked up during the reward window carries on till the communications device gets access.

Fifthly, some embodiments disclosed herein allow the AP to optimize groups of one or more communications devices to be allocated to different access windows. For instance, if it turns out that a communications device often accesses the channel outside its preferred window, it may be moved to a new window. Thus the reward window may be customized according to the communications device' running needs.

BRIEF DESCRIPTION OF DRAWINGS

Examples of embodiments herein are described in more detail with reference to attached drawings in which:

FIG. 4 is a flowchart schematically illustrating embodiments of a method performed by a communications device;

DETAILED DESCRIPTION

As part of developing embodiments herein, some problems with the state of the art communications networks will first be identified and discussed.

Many of the communications devices, such as the LRLP devices, operating in a communications network will be sensors that transmit data at rather regular intervals. The current IEEE 802.11ax contention mechanism is not optimally suited for such communications devices since the contention mechanism does not exploit the regular transmission behaviour of these communications devices. In addition, the RAW mechanism of the IEEE 802.11ah is limited to time-domain allocations exclusive to certain groups of communications devices.

A problem addressed by embodiments herein is therefore how to improve performance in a wireless communications network.

Therefore, as mentioned above, according to embodiments herein, a way of improving the performance in the wireless communications network is provided.

Embodiments herein provide various scheduling mechanisms for a communications device, e.g. a low-power device, that transmit small amounts of data in roughly regular time intervals. The communications device may associate or may be associated with the AP as a special class for regular transmission, herein called a Regular-TX class, indicating that it needs to transmit small amounts of data to the AP in roughly regular time intervals, e.g. at time points T time-units apart. Following the association, the AP suggests a start time for these transmission attempts. The start time may be chosen, for example, to avoid 'rush-hours' from other already associated Regular-TX devices. The AP also rewards the communications device for roughly regular transmission attempts by allowing it to use a lower CWO value during short intervals ($nT\pm\delta$; $\delta<<T$) placed around the expected transmission times of the communications. Outside these intervals, the communications device uses a regular CWO value.

Note that although terminology from WLAN is used in this disclosure to exemplify the embodiments herein, this should not be seen as limiting the scope of the embodiments herein to only the aforementioned system. Other wireless systems, such as for example Wideband Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Figure 1:
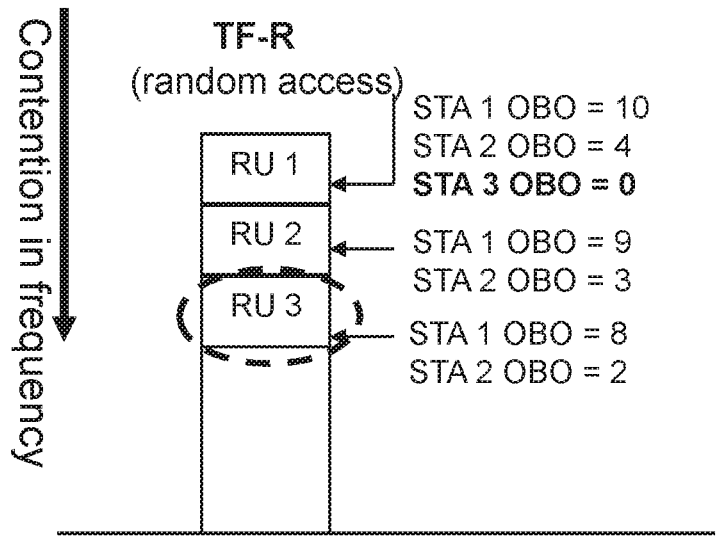
FIG. 1 is a schematic block diagram illustrating a Trigger Frame for Random access (TF-R) and contention according to prior art.
Figure 2:
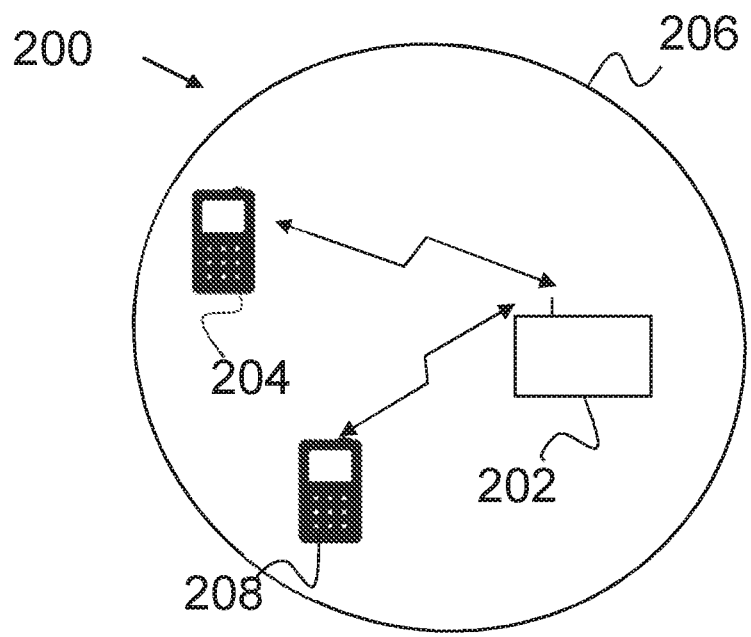
FIG. 2 is a schematic block diagram illustrating embodiments of a communications network.

In this section, the embodiments herein will be illustrated in more detail by a number of exemplary embodiments. It should be noted that these embodiments are not mutually exclusive. Components from one embodiment may be assumed to be present in another embodiment and it will be obvious to a person skilled in the art how those components may be used in the other exemplary embodiments, FIG. 2 depicts an example of a communications network 200 in which embodiments herein may be implemented. The communications network 200 is a wireless communications network such as a contention based communications network, or a communications network that deploy some kind of random backoff, e.g. within Contention Window (CW), before allowing transmission when the communications network 200 has been found to be idle. However, the communications network 200 may be another type of communications network having contention-based access employing schemes that are similar to random backoff schemes. Thus, it may be a WLAN, an LTE network, a Wideband Code Division Multiple Access (WCDMA) network, a Global System for Mobile Communications (GSM) network, any 3GPP cellular network, Worldwide Interoperability for Microwave Access (WiMAX) network, any other wireless network having contention-based access employing some kind of random backoff, or a combination of one or more of the aforementioned communications networks.

An AP 202 operates in the communications network 200. Thus, the AP 202 is configured to operate in the communications network 200. The AP 202 may be comprised in the communications network 400.

The AP 202 may be a wireless access node, such as a WLAN access node or a radio access node. The radio access node may be a radio base station, for example an eNB, i.e. an eNodeB, or a Home Node B, an Home eNode B or any other network node capable to serve and/or communicate with a communications device, such as a STA, in the communications network 200.

A communications device 204 operates in the communications network 200. Thus, the communications device 204 is configured to operate in the communications network 200. The communications device 204 may be any wireless device, such as an Internet of Things (IoT) device, an LRLP device such as a sensor, or a user equipment, just to give some examples.

In some embodiments the non-limiting term UE is used and it refers to any type of wireless device communicating with a network node in a communications network. Examples of wireless devices are target devices, device to device UEs, machine type UEs or UEs capable of machine to machine communication, Personal Digital Assistants (PDA), iPADs, Tablets, mobile terminals, smart phones, Laptop Embedded Equipped (LEE), Laptop Mounted Equipment (LME), USB dongles etc.

In this disclosure the terms communications device, wireless device and UE are used interchangeably. Please note the term user equipment used in this document also covers other wireless devices such as Machine to Machine (M2M) devices, even though they do not have any user.

Further, the AP 202 and the communications device 204 are configured for wireless communication with each other when being located within a geographical area 206 served by one of the nodes, e.g. the AP 202, having radio coverage within the geographical area 208. Herein, this is also specified as the AP 202 manages or is configured to manage communication with the communications device 204 in the geographical area 206. The geographical area 206 may be determined as the area where communication between the network nodes are possible, given one or more constraints on, e.g., output power, required data rate and similar. In this disclosure, the geographical area 206 is sometimes also referred to as a coverage area, a cell or a cluster.

Further, it should be understood that one or more further communications devices 208 may be operating in the communications network 200, and configured to communicate with the AP 202 within the geographical area 206. The one or more further communications device 208 may be any wireless devices, such as one or more Internet of Things (IoT) devices, one or more LRLP devices such as one or more sensors, one or more user equipment or a combination thereof, just to give some examples. One or more communications devices 204, 208 may be said to belong to the same Basic Serving Set (BSS) when operating within the geographical area 206.

Figure 3:
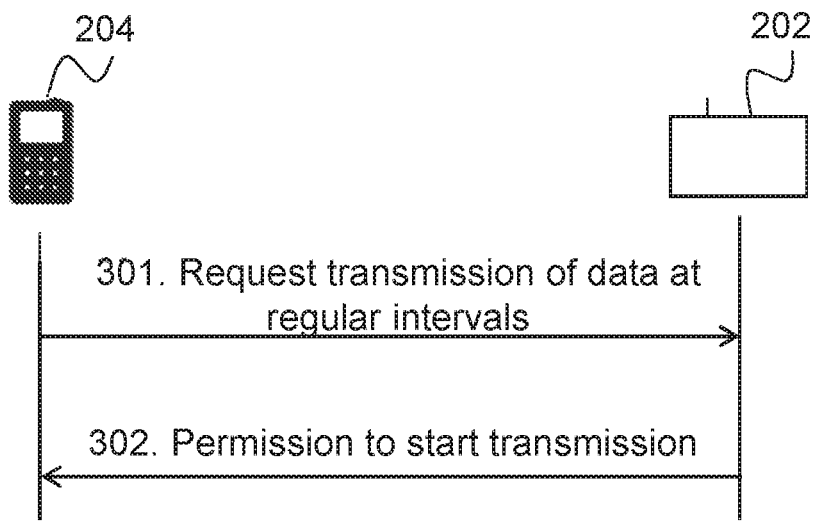
FIG. 3 is a schematic combined flowchart and signalling scheme of embodiments of a communications network.

FIG. 3 is a schematic combined flowchart and signalling scheme of embodiments of the communications network 200. As previously mentioned, the communications device 204 and the AP 202 are operating in the communications network 200.

Action 301

The communications device 204 may request transmission of data at regular intervals to the AP 202. In other words, the communications device 204 may transmit a request to the AP 202, which request informs the AP 202 that the communications device 204 wants to transmit data to the AP 202 at regular time intervals. The data may be small amount of data, such as sensor information or alerts. Further, the communications device 204 may want to transmit the data at regular time intervals spaced apart a specified number of time units. This may also be expressed as the communications device 204 may associate or may be associated with the AP 202 as a special class for regular transmission, e.g. a Regular-TX class, indicating that it needs to transmit small amounts of data to the AP 202 in roughly regular time intervals, e.g. at time points T time-units apart This relates to Actions 400 and 701 which will be described in more detail below.

Action 302

The AP 202 transmits, to the communications device 204, a permission to start transmission. The permission may comprise information about a point in time when to start the transmission. This relates to Action 702 which will be described in more detail below.

Examples of methods performed by the communications device 204 for accessing a Resource Unit (RU) will now be described with reference to the flowchart depicted in FIG. 4.

Figure 5:
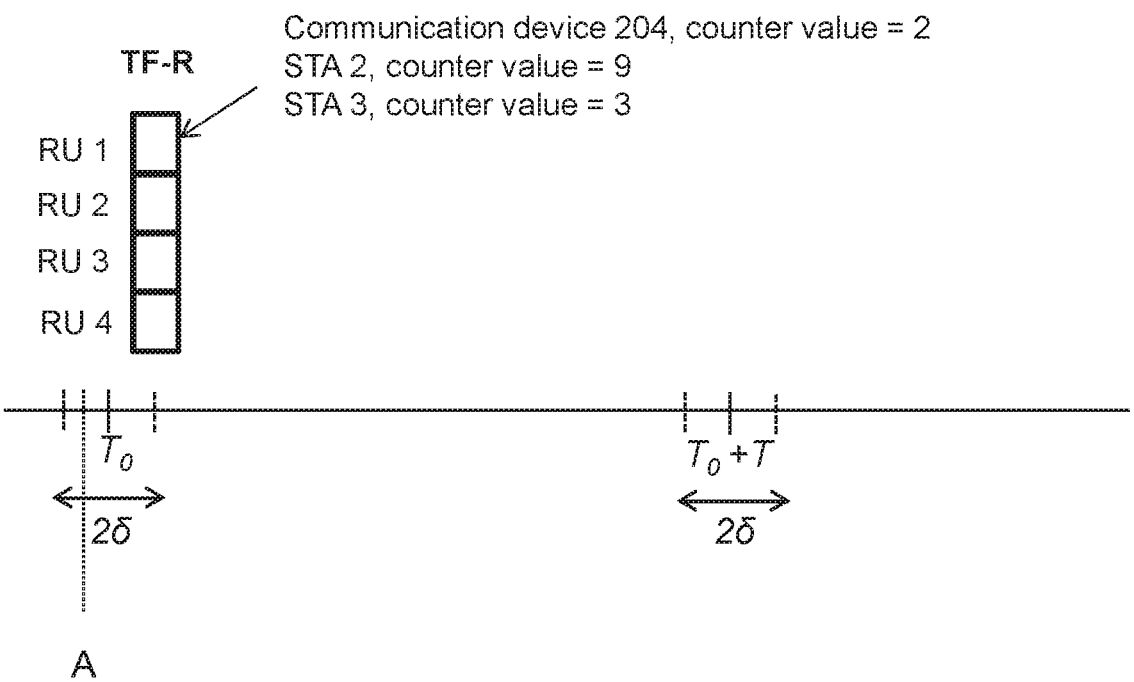
FIG. 5 schematically exemplifies contention of some available RU according to some embodiments.

Reference will also be made to FIG. 5 which schematically exemplifies contention of some available RU according to some embodiments.

As previously mentioned, the communications device 204 and the AP 202 are operating in the communications network 200.

The methods comprise one or more of the following actions. It should be understood that these actions may be taken in any suitable order and that some actions may be combined.

Action 400

The communications device 204 may transmit a request to the AP 202, which request informs the AP 202 that the communications device 204 wants to transmit data to the AP 202 at regular time intervals.

This Action relates to Action 301 described above.

Action 401

The communications device 204 determines whether or not to start an access attempt within a time interval.

By the expression "an access attempt" when used herein is meant "an attempt to capture an RU", i.e. "an attempt to access an RU". However it should be understood that the actual capture of the RU, i.e. the actual accessing of the RU, may occur at a point in time outside the time interval as long as the start point of time of the access attempt is within the time interval.

The time interval is sometimes in this disclosure referred to as a reward window.

The time interval may be given by $(T_0+nT)\pm\delta$ wherein $T_0$ is a start point of time, T is a number of time units between two consecutive time intervals, n is a non-negative integer, and $2\delta$ is a length of the time interval, wherein $\delta \ll T$.

In some embodiments, the communications device 204 determines to perform an access attempt within the time interval. This may be the case when the communications device 204 wants to transmit at predetermined regular time intervals.

However, in some embodiments, the communications device 204 determines to perform an access attempt outside the time interval, e.g., outside a predetermined time interval, when such an access attempt is more power efficient than a transmission attempt within the time interval. For example, an inactive communications device 204, e.g. a sleeping communications device 204, may turn active, e.g. wake up, to listen for DL data from the AP 202, and then the communications device 204 may determine that it would be more desirable or more power efficient to use the awaken time for an uplink transmission instead of re-entering the inactive mode, and thus it may determine to transmit outside the time interval.

FIG. 5 schematically illustrates that the communications device 204 wakes up at a point of time A. At this point of time A, the communications device 204 determines whether or not it wants to start an access attempt within the time interval given by $(T_0+nT)\pm\delta$. For example and as illustrated in FIG. 5, the communications device 204 may determine to start an access attempt within a time interval given by $T_0\pm\delta$ or by $(T_0+T)\pm\delta$.

Action 402

When wanting to start an access attempt within the time interval, the communications device 204 randomly selects a counter value from a first range given by zero and a first Contention-Window OFDMA (CWO) value $CWO_1$.

This may be the case when the communications device 204 wants to transmit data to the AP 202 at regular occurring time intervals, e.g. it wants to transmit to AP 202 every second hour. The data may be sensor information, sensor updates, alerts, sensor recordings, etc.

In some embodiments, the time interval may be initiated or renegotiated by communicating with the AP 202. In such embodiments, the communications device 204 may obtain the time interval by transmitting, to the AP 202, a request to access a RU for transmitting data at points in time spaced apart by T time units, and by receiving, from the AP 202, information relating to the start point of time $T_0$, the first CWO value $CWO_1$, and the $\delta$ of the time interval.

Thus, the time interval may be a time interval that is previously agreed on with the AP 202 or that is predetermined or preconfigured. Further, when the communications device 204 wants to start the access attempt within the time interval, the communications device 204 randomly selects the counter value within the first range. As will be described in relation to Action 402 below, this first range is smaller than a second range from which the communications device 204 should randomly select the counter value when wanting to start the access attempt outside the time interval, e.g. outside the predetermined or pre-agreed time interval. By randomly selecting the counter from a smaller range, the likelihood of selecting a low counter value is larger and thus the likelihood of winning a contention, e.g., winning access to an RU, is larger. Thus, it could be said that the communications device 104 is rewarded when wanting to start the access attempt within the predetermined time interval.

The communications device 204 may be configured with one or more CWO values, e.g. with the first CWO value $CWO_1$, but the communications device 204 may also receive one or more CWO values, e.g. the first CWO value $CWO_1$, from a network node, such as the AP 202.

In FIG. 5, if the communications device 204 wants to start an access attempt within the time interval, the communications device 204 randomly selects the counter value from the first range given by zero and the first CWO value $CWO_1$. In this case the counter value is randomly selected to be 2. The counter values for the two further communications devices 208, which in FIG. 5 are denoted as STA 2 and STA 3, are selected to be 9 and 3, respectively.

Action 403

When wanting to start an access attempt outside the time interval, the communications device 204 randomly selects the counter value from a second range given by zero and a second CWO value $CWO_2$. As mentioned above, the second CWO value $CWO_2$ is larger than the first CWO value $CWO_1$. In other words, the second range is larger than the first range.

Thus, it may be less favourable for the communications device 204 to start the access attempt outside the time interval since it then may randomly select a larger counter value than if the communications device 204 want to start the access attempt within the time interval.

This may be the case when the communications device 204 wants to transmit data to the AP 202 outside the regular occurring time intervals, e.g. outside the time intervals of one minute every second hour. The data may be sensor information, sensor updates, alerts, sensor recordings.

Action 404

The communications device 204 performs a contention procedure using the selected counter value, wherein a Resource Unit (RU) is accessed in dependence of the performed contention procedure.

By the expression "contention procedure" when used in this disclosure is meant a procedure where multiple communication devices attempt to capture a communications medium. Some examples of contention procedures are a Carrier Sense Multiple Access with Collision Avoidance (CSMA/CA) procedure and a procedure comprising contention for subbands which may be followed by a special trigger from the AP, e.g. the AP 202.

Thus, based on the selected counter value, the communications device 204 determines by means of the contention procedure whether or not it may access a RU and accesses the RU if access is permitted.

In some embodiments, the communications device 204 performs the contention procedure by receiving, from the AP 202, first information about a first number of available RUs. When the selected counter value is equal to or lesser than the first number of available RUs, the communications device 204 is successful in its access attempt and accesses one RU among the first number of available RUs for transmission, and when the selected counter value is larger than the first number of available RUs, the communications device 204 is unsuccessful and therefore defers from accessing.

Alternatively, in some embodiments when the selected counter value is larger than the first number of available RUs, the communications device 204 is unsuccessful in its access attempts and performs the contention procedure by decrementing the selected counter value with the first number of available RUs and by receiving, from the AP 202, second information about a second number of available RUs. Further, when the decremented counter value is equal to or lesser than the second number of available RUs, the communications device 204 is successful in its access attempt and accesses one RU among the second number of available RUs for transmission, and when the decremented counter value is larger than the second number of available RUs, the communications device 204 is unsuccessful and therefore defers from accessing.

The first number of available RUs and the second number of available RUs may be a first Trigger Frame for Random access (TF-R) and a second TF-R, respectively.

In FIG. 5, the number of available RUs for transmission are four, e.g. RU 1-RU 4. Further, since the communications device's 204 counter value, randomly selected as described in Action 402, was selected to be 2 and since the selected counter value is equal to or lesser than the number of available RUs, the communications device 204 is successful in its access attempt and accesses one RU among the number of available RUs for transmission.

Action 405

In some embodiments, the communications device 204 enters an inactive mode between a first access attempt and a second access attempt. For example, the inactive mode may be a sleep mode or an idle mode.

As mentioned above, by the expression "an access attempt" when used herein is meant "an attempt to capture an RU", i.e. "an attempt to access an RU". Thus, a first access attempt is an attempt to capture a first RU and a second access attempt is an attempt to capture a second RU.

The communications device 204 may enter the inactive mode after a successful access attempt and transmittal of data to the AP 202. Further, the communication device 204 may stay in the inactive mode until its next access attempt. Thus, the communication device 204 may be in the inactive mode during the number of time units T between two consecutive time intervals.

In some embodiments, the communications device 204 enters the inactive mode when it was unsuccessful in its access attempt and while it is awaiting the second information about a second number of available RUs as described in Action 404 above.

For example, the communications device 204 may be in the inactive mode during the time period between $T_0+\delta$ and by $(T_0+T)-\delta$ schematically illustrated in FIG. 5.

Figure 6:
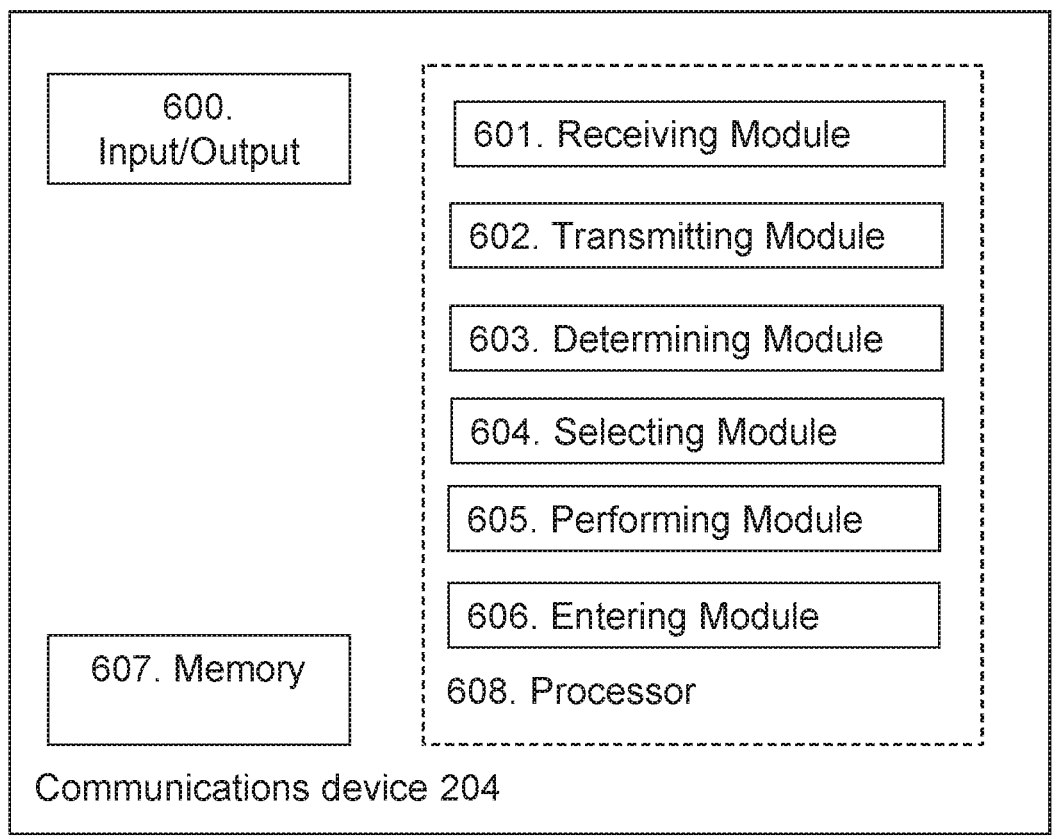
FIG. 6 is a block diagram schematically illustrating embodiments of a communications device.

To perform the method for accessing a Resource Unit (RU), the communications device 204 may be configured according to an arrangement depicted in FIG. 6. As previously perform the mentioned, the communications device 204 and the AP are configured to operate in the wireless communications network 200.

The communications device 204 comprises an input and output interface 600 configured to communicate the AP 202. The input and output interface 600 may comprise a wireless receiver (not shown) and a wireless transmitter (not shown).

The communications device 204 is configured to receive, e.g. by means of a receiving module 601 configured to receive, a transmission from the AP 202. The receiving module 601 may be implemented by or arranged in communication with a processor 608 of the communications device 204. The processor 608 will be described in more detail below.

For example, the communications device 204 may be configured to receive, from the AP 202, information relating to the start point of time $T_0$, the first CWO value $CWO_1$, and the $\delta$ of the time interval.

The communications device 204 is configured to transmit, e.g. by means of a transmitting module 602 configured to transmit, a transmission to the AP 202. The transmitting module 602 may be implemented by or arranged in communication with the processor 608 of the communications device 204.

In some embodiments, the communications device 204 is configured to transmit, to the AP 202, a request to access a RU for transmitting data at points in time spaced apart by T time units.

The communications device 204 may be configured to determine, e.g. by means of a determining module 603 configured to determine, whether or not to start an access attempt within a time interval. The determining module 603 may be implemented by or arranged in communication with the processor 608 of the communications device 204.

As previous mentioned, the time interval may be given by $(T_0+nT)\pm\delta$ wherein $T_0$ is a start point of time, T is a number of time units between two consecutive time intervals, n is a non-negative integer, and $2\delta$ is a length of the time interval, wherein $\delta \ll T$.

In some embodiments, the communications device 204 is configured to determine to perform the access attempt outside the time interval when such an access attempt is more power efficient than a transmission attempt within the time interval.

The communications device 204 is configured to select, e.g. by means of a selecting module 604 configured to select, a counter value. The selecting module 604 may be implemented by or arranged in communication with the processor 608 of the communications device 204.

When wanting to start an access attempt within a time interval, the communications device 204 is configured to randomly select a counter value from a first range given by zero and a first CWO value $CWO_1$.

When wanting to start an access attempt outside the time interval, the communications device 204 is configured to randomly select the counter value from a second range given by zero and a second CWO value $CWO_2$. The second CWO value $CWO_2$ is larger than the first CWO value $CWO_1$. Thus, when wanting to start the access attempt outside the time interval, the counter value is selected from a larger range of CWO values, and therefore a counter value might be selected that is less favourable in terms of winning a RU may be selected.

The communications device 204 may be configured to perform, e.g. by means of a performing module 605 configured to perform, a contention procedure. The performing module 604 may be implemented by or arranged in communication with the processor 608 of the communications device 204.

The communications device 204 is configured to perform the contention procedure using the selected counter value, whereby a RU is accessed in dependence of the performed contention procedure.

In some embodiments, the communications device 204 is configured to perform the contention procedure by further being configured to receive, from the AP 202, first information about a first number of available RUs. Further, when the randomly selected counter value is equal to or lesser than the first number of available RUs, the communications device 204 is configured to access one RU among the first number of available RUs for transmission. Alternatively, when the randomly selected counter value is larger than the first number of available RUs, the communications device 204 is configured to defer from accessing.

Further, when the randomly selected counter value is larger than the first number of available RUs, the communications device 204 may be configured to decrement the randomly selected counter value with the first number of available RUs, and to receive, from the AP 202, second information about a second number of available RUs. When the decremented counter value is equal to or lesser than the second number of available RUs, the communications device 204 may be configured to access one RU among the second number of available RUs for transmission. Alternatively, when the decremented counter value is larger than the second number of available RUs, the communications device 204 may be configured to defer from accessing.

The communications device 204 may be configured to enter, e.g. by means of a entering module 606 configured to enter, an inactive mode between a first access attempt and a second access attempt. The entering module 606 may be implemented by or arranged in communication with the processor 608 of the communications device 204.

The communications device 204 may also comprise means for storing data. In some embodiments, the communications device 204 comprises a memory 607 configured to store the data. The data may be processed or non-processed data and/or information relating thereto. The memory 607 may comprise one or more memory units. Further, the memory 607 may be a computer data storage or a semiconductor memory such as a computer memory, a read-only memory, a volatile memory or a non-volatile memory. The memory is arranged to be used to store obtained information, data, configurations, schedulings, and applications etc. to perform the methods herein when being executed in the communications device 204.

Embodiments herein for accessing an RU may be implemented through one or more processors, such as the processor 608 in the arrangement depicted in FIG. 6, together with computer program code for performing the functions and/or method actions of embodiments herein. The program code mentioned above may also be provided as a computer program product, for instance in the form of a data carrier carrying computer program code for performing the embodiments herein when being loaded into the communications device 204. One such carrier may be in the form of an electronic signal, an optical signal, a radio signal or a computer readable storage medium. The computer readable storage medium may be a CD ROM disc or a memory stick.

The computer program code may furthermore be provided as program code stored on a server and downloaded to the communications device 204.

Those skilled in the art will also appreciate that the input/output interface 600, the receiving module 601, the transmitting module 602, the determining module 603, the selecting module 604, the performing module 605 and the entering module 606 above may refer to a combination of analog and digital circuits, and/or one or more processors configured with software and/or firmware, e.g. stored in the memory 607, that when executed by the one or more processors such as the processors in the communications device 204 perform as described above. One or more of these processors, as well as the other digital hardware, may be included in a single Application-Specific Integrated Circuitry (ASIC), or several processors and various digital hardware may be distributed among several separate components, whether individually packaged or assembled into a System-on-a-Chip (SoC).

Figure 7:
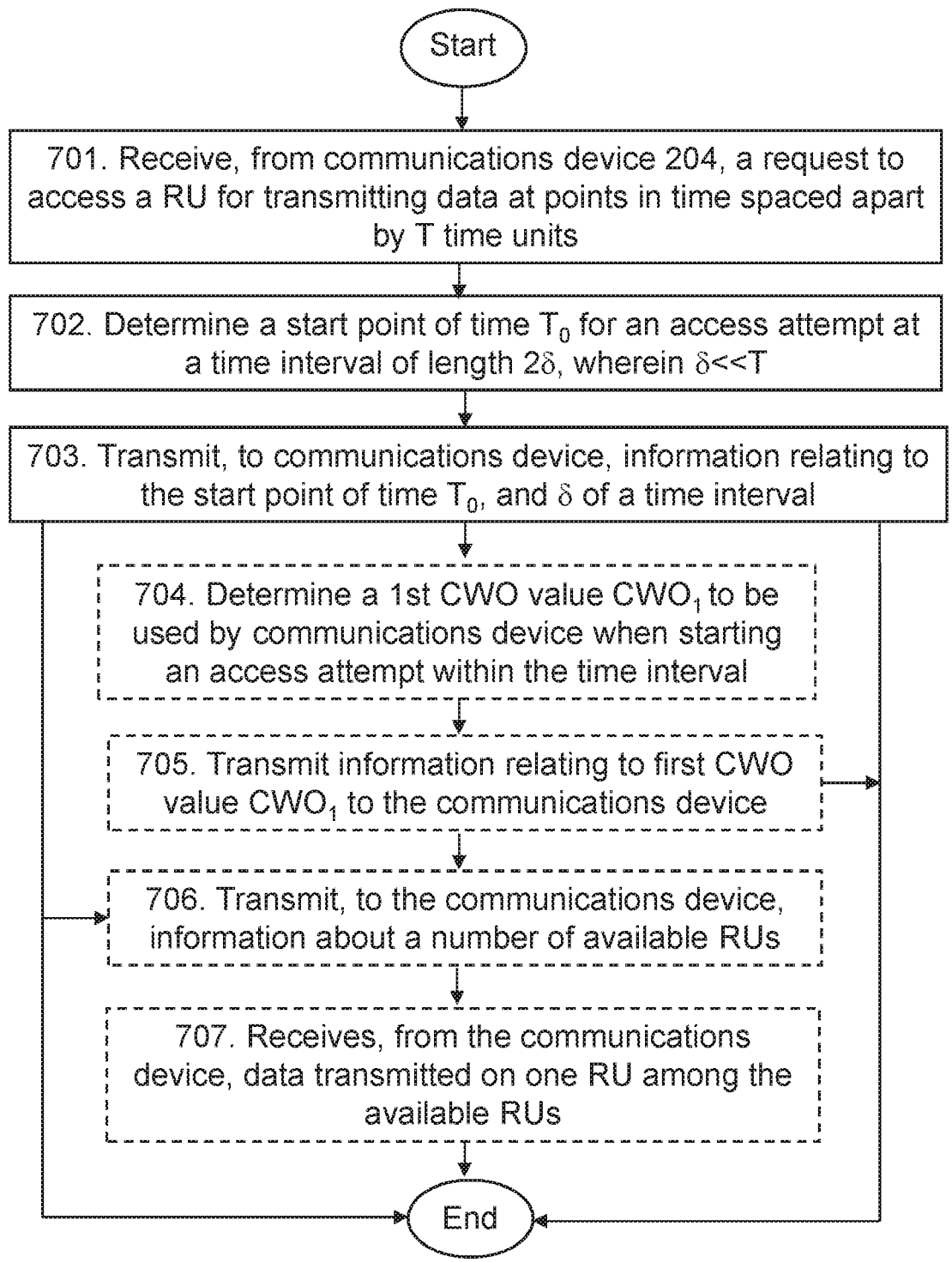
FIG. 7 is a flowchart schematically illustrating embodiments of a method performed by an Access Point (AP)

Examples of methods performed by the AP 202 for controlling access to a Resource Unit (RU) by the communications device 204 will now be described with reference to the flowchart depicted in FIG. 7. As previously mentioned, the AP 202 and the communications device 204 are operating in the communications network 200.

The methods comprise one or more of the following actions. It should be understood that these actions may be taken in any suitable order and that some actions may be combined.

Action 701

The AP 202 receives, from the communications device 204, a request to access a RU for transmitting data at points in time spaced apart by T time units.

In some embodiments, the AP 202 receives the request upon initialisation before the communications device 204 has transmitted any data. However, the AP 202 may receive the request after initialisation when the communications device 204 has transmitted data. In the latter case, the request may be transmitted by the communications device 204 to the AP 202 in order to request a change of the points in time spaced apart by T time units when the data is to be transmitted. Thus, the request may be received by the AP 202 when the communications device 204 wants to renegotiate the terms for the transmission of data.

Action 702

The AP 202 determines a start point of time $T_0$ for an access attempt at a time interval of length $2\delta$, wherein $\delta \ll T$.

In some embodiments, the AP 202 determines the start point of time $T_0$ for the access attempt by further determining the start point of time $T_0$ for the access attempt for the communications device 204 to be different from a previously determined start point of time for another access attempt from one or more further communications device 208. Thus, the AP 202 may determine the start point of time $T_0$ such that the start points of time for all communications devices 204, 208 operating in the communications network 200 are distributed in time and thereby also distributing the transmission from them in time, which reduces the risk of transmission collisions.

The AP 202 may determine the start point of time $T_0$ for the access attempt by determining a load in the wireless communications network 200, and determining the start point of time $T_0$ for the access attempt for the communications device 204 based on the determined load. For example, this may be the case when several further communications devices 208 are operating in the communications network 200 causing a high load in the communications network 200 which load the AP 202 has to consider when determining the start point of time $T_0$.

Action 703

The AP 202 transmits, to the communications device 204, information relating to the start point of time $T_0$ and $\delta$ of a time interval. Thereby, the AP 202 informs the communications device 204 when it is allowed to start the first access attempt after initialisation and about half the time interval.

Action 704

In some embodiments, the AP 202 determines a first CWO value $CWO_1$ to be used by the communications device 204 when starting an access attempt within the time interval. For example, this may be the case when the communications device 204 is not preconfigured with the first CWO value $CWO_1$ or when the AP 202 wants to change the first CWO value $CWO_1$ to be used by the communications device 204. For example, if the AP 202 wants to give favour to the communications device 204 it may determine a smaller first CWO value $CWO_1$ as compared to the case when the communications device 204 is not be given any favour.

Action 705

In some embodiments, the AP 202 transmits information relating to the first CWO value $CWO_1$ to the communications device 204. This may be the case when the AP 202 has determined the first CWO value CWO1 as described in Action 704 above. Thereby, the communications device 204 is informed about the first CWO value $CWO_1$ that it may select to use.

Action 706

In some embodiments, the AP 202 transmits, to the communications device 204, information about a number of available RUs. This is done in order to inform the communications device 204 about available RUs that may be used for transmission.

Action 707

In some embodiments, the AP 202 receives, from the communications device 204, data transmitted on one RU among the available RUs.

Figure 8:
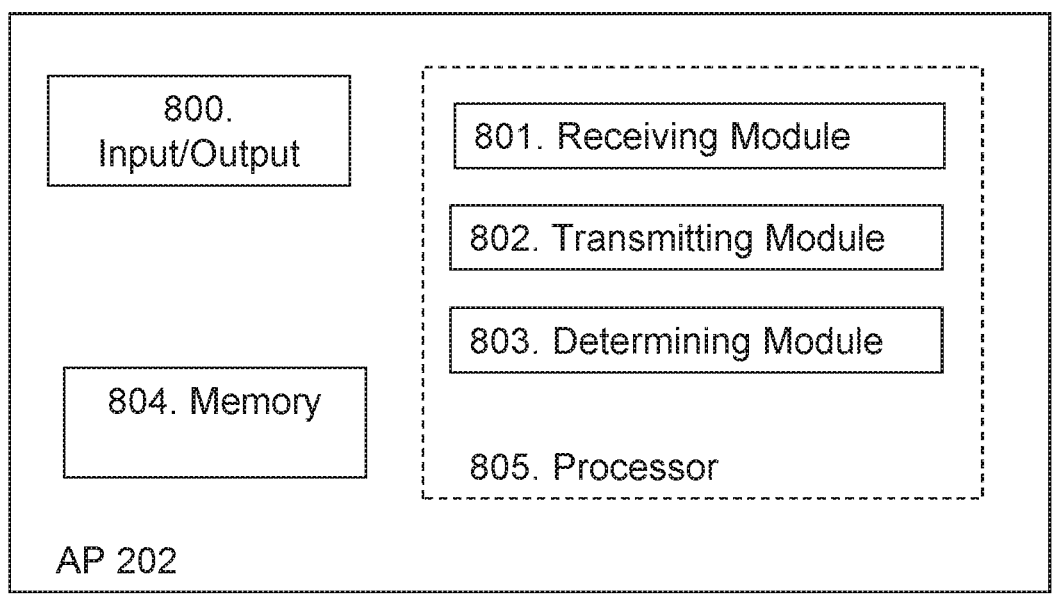
FIG. 8 is a block diagram schematically illustrating embodiments of an Access Point (AP).

To perform the method for controlling access to a Resource Unit (RU), the AP 202 may be configured according to an arrangement depicted in FIG. 8. As previously perform the mentioned, the AP 202 and the communications device 204 are operating in the wireless communications network 200.

The AP 202 comprises an input and output interface 800 configured to communicate with one or more communications devices, e.g. to communications device 204 and one or more possible further communications devices 208. The input and output interface 800 may comprise a wireless receiver (not shown) and a wireless transmitter (not shown).

The AP 202 is configured to receive, e.g., by means of a receiving module 801 configured to receive, a transmission from one or more communications device, e.g. from the communications device 204. The receiving module 801 may be implemented by or arranged in communication with a processor 805 of the AP 202. The processor 805 will be described in more detail below.

The AP 202 is configured to receive, from the communications device 204, a request to access a RU for transmitting data at points in time spaced apart by T time units.

In some embodiments, the AP 202 is configured to receive, from the communications device 204, data transmitted on one RU among a number of available RUs.

The AP 202 is configured to transmit, e.g. by means of a transmitting module 802 configured to transmit, a transmission to the communications device 204. The transmitting module 802 may be implemented by or arranged in communication with the processor 805 of the AP 202.

The AP 202 is configured to transmit, to the communications device 204, information relating to the start point of time $T_0$, and $\delta$ of a time interval.

In some embodiments, the AP 202 is configured to transmit, to the communications device 204, information relating to a determined first CWO value $CWO_1$.

The AP 202 may be configured to transmit, to the communications device 204, information about a number of available RUs.

The AP 202 may be configured to determine, e.g. by means of a determining module 803 configured to determine, a start point of time $T_0$ for an access attempt at a time interval of length $2\delta$, wherein $\delta \ll T$. The determining module 803 may be implemented by or arranged in communication with the processor 805 of the AP 202.

In some embodiments, the AP 202 is configured to determine a first CWO value $CWO_1$ to be used by the communications device 204 when starting an access attempt within the time interval.

The AP 202 may be configured to determine the start point of time $T_0$ for the access attempt by being configured to determine the start point of time $T_0$ for the access attempt for the communications device 204 to be different from a previously determined start point of time for another access attempt from one or more further communications devices 208.

In some embodiments, the AP 202 is configured to determine the start point of time $T_0$ for the access attempt by being configured to determine a load in the wireless communications network 200 and to determine the start point of time $T_0$ for the access attempt for the communications device 204 based on the determined load.

The AP 202 may also comprise means for storing data. In some embodiments, the AP 202 comprises a memory 804 configured to store the data. The data may be processed or non-processed data and/or information relating thereto. The memory 804 may comprise one or more memory units. Further, the memory 804 may be a computer data storage or a semiconductor memory such as a computer memory, a read-only memory, a volatile memory or a non-volatile memory. The memory is arranged to be used to store obtained information, data, configurations, schedulings, and applications etc. to perform the methods herein when being executed in the AP 202.

Embodiments herein for controlling access to an RU may be implemented through one or more processors, such as the processor 805 in the arrangement depicted in FIG. 8, together with computer program code for performing the functions and/or method actions of embodiments herein. The program code mentioned above may also be provided as a computer program product, for instance in the form of a data carrier carrying computer program code for performing the embodiments herein when being loaded into the AP 202. One such carrier may be in the form of an electronic signal, an optical signal, a radio signal or a computer readable storage medium. The computer readable storage medium may be a CD ROM disc or a memory stick.

The computer program code may furthermore be provided as program code stored on a server and downloaded to the AP 202.

Those skilled in the art will also appreciate that the input/output interface 800, the receiving module 801, the transmitting module 802, and the determining module 803 above may refer to a combination of analog and digital circuits, and/or one or more processors configured with software and/or firmware, e.g. stored in the memory 804, that when executed by the one or more processors such as the processors in the AP 202 perform as described above. One or more of these processors, as well as the other digital hardware, may be included in a single Application-Specific Integrated Circuitry (ASIC), or several processors and various digital hardware may be distributed among several separate components, whether individually packaged or assembled into a System-on-a-Chip (SoC).

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method performed by an Access Point, AP, for controlling access to a Resource Unit, RU, by a communications device, wherein the AP and the communications device are operating in a wireless communications network, and wherein the method comprises:

receiving, from the communications device, a request for the communications device to make contention-based RU access attempts for purposes of regularly transmitting data at points in time spaced apart by T time units;

determining a start point of time $T_0$ for an access attempt to be made within a time interval of length $2\delta$, wherein $\delta < T$, and wherein the time interval is given by $(T_0 + nT) \pm \delta$ wherein $T_0$ is the start point of time, and n is a non-negative integer; and transmitting, to the communications device, information relating to the start point of time $T_0$, and $\delta$ of the time interval, wherein the determining of the start point of time $T_0$ for the access attempt comprises:

determining a load in the wireless communications network; and determining the start point of time $T_0$ for the access attempt for the communications device based on the determined load.

2. The method of claim 1, further comprising:
determining a first Contention-Window OFDMA (CWO) value $CWO_1$ to be used by the communications device when starting an access attempt within the time interval;
transmitting information relating to the first CWO value $CWO_1$ to the communications device.

3. The method of claim 1, further comprising:
transmitting, to the communications device, information about a number of one or more available RUs; and
receiving, from the communications device, data transmitted on one RU among the available RUs.

4. The method of claim 1, wherein the determining of the start point of time $T_0$ for the access attempt comprises:
determining the start point of time $T_0$ for the access attempt for the communications device to be different from a previously determined start point of time for another access attempt from one or more further communications devices.

5. An Access Point, AP, for controlling access to a Resource Unit, RU, by a communications device, wherein the AP and the communications device are configured to operate in a wireless communications network, and wherein the AP is configured to:
receive, from the communications device, a request for the communications device to make contention-based RU access attempts for purposes of regularly transmitting data at points in time spaced apart by T time units;
determine a start point of time $T_0$ for an access attempt to be made within a time interval of length $2\delta$, wherein $\delta<T$, and wherein the time interval is given by $(T_0+nT)\pm\delta$ wherein $T_0$ is the start point of time, and n is a non-negative integer; and
transmit, to the communications device, information relating to the start point of time $T_0$, and $\delta$ of the time interval,
wherein the AP is configured to determine the start point of time $T_0$ for the access attempt by further being configured to:
determine a load in the wireless communications network; and
determine the start point of time $T_0$ for the access attempt for the communications device based on the determined load.

6. The AP of claim 5, further being configured to:
determine a first Contention-Window OFDMA (CWO) value $CWO_1$ to be used by the communications device when starting an access attempt within the time interval;
transmit information relating to the first CWO value $CWO_1$ to the communications device.

7. The AP of claim 5, further being configured to:
transmit, to the communications device, information about one or more available RUs; and
receive, from the communications device, data transmitted on one RU among the available RUs.

8. The AP of claim 5, wherein the AP is configured to determine the start point of time $T_0$ for the access attempt by further being configured to:
determine the start point of time $T_0$ for the access attempt for the communications device to be different from a previously determined start point of time for another access attempt from one or more further communications devices.

9. A nontransitory computer readable storage medium comprising a computer program, comprising instructions which, when executed on at least one processor, causes the at least one processor to carry out a method of an Access Point, AP, for controlling access to a Resource Unit, RU, by a communications device, wherein the AP and the communications device are operating in a wireless communications network, and wherein the method comprises:
receiving, from the communications device, a request for the communications device to make contention-based RU access attempts for purposes of regularly transmitting data at points in time spaced apart by T time units;
determining a start point of time $T_0$ for an access attempt to be made within a time interval of length $2\delta$, wherein $\delta<T$, and wherein the time interval is given by $(T_0+nT)\pm\delta$ wherein $T_0$ is the start point of time, and n is a non-negative integer; and
transmitting, to the communications device, information relating to the start point of time $T_0$, and $\delta$ of the time interval,
wherein the determining of the start point of time $T_0$ for the access attempt comprises:
determining a load in the wireless communications network; and
determining the start point of time $T_0$ for the access attempt for the communications device based on the determined load.

* * * * *